United States Patent [19]

Behn

[11] Patent Number: 4,771,362

[45] Date of Patent: Sep. 13, 1988

[54] ELECTRICAL CAPACITOR COMPOSED OF A CONSOLIDATED WINDING OR CONSOLIDATED STACK OF METALLIZED PLASTIC PLIES LAYERED TO ONE ANOTHER AND METHOD FOR THE MANUFACTURE THEREOF

[75] Inventor: Reinhard Behn, Munich, Fed. Rep. of Germany

[73] Assignee: Siemens Aktiengesellschaft, Berlin and Munich, Fed. Rep. of Germany

[21] Appl. No.: 88,394

[22] Filed: Aug. 24, 1987

[30] Foreign Application Priority Data

Sep. 2, 1987 [DE] Fed. Rep. of Germany ....... 3629837

[51] Int. Cl.⁴ .................... H02B 1/04; H01G 13/06; H01G 4/08
[52] U.S. Cl. ................... 361/306; 29/25.42; 361/323
[58] Field of Search ............... 29/25.42; 361/306, 308, 361/309, 310, 323, 273

[56] References Cited

U.S. PATENT DOCUMENTS

| | | | |
|---|---|---|---|
| 3,069,283 | 12/1962 | Coleman | 117/4 |
| 3,252,830 | 5/1966 | Cummin | 117/217 |
| 3,654,532 | 4/1972 | Rayburn | 361/323 X |
| 3,855,507 | 12/1974 | Hoyler | 361/323 X |
| 4,563,724 | 1/1986 | Behn | 29/25.42 X |
| 4,635,164 | 1/1987 | Behn et al. | 29/25.42 X |
| 4,639,832 | 1/1987 | Behn | 361/306 |
| 4,656,557 | 4/1987 | Behn et al. | 361/323 X |
| 4,667,382 | 5/1987 | Behn et al. | 29/25.42 |

FOREIGN PATENT DOCUMENTS

| | | |
|---|---|---|
| 0026933 | 10/1980 | European Pat. Off. . |
| 0192159 | 8/1986 | European Pat. Off. . |
| 2831736 | 1/1980 | Fed. Rep. of Germany ..... 29/25.42 |
| 2497393 | 7/1982 | France ................ 29/25.42 |
| 71952 | 6/1976 | Japan ................ 29/25.42 |
| 24554 | 3/1978 | Japan ................ 29/25.42 |
| 868889 | 5/1961 | United Kingdom ............ 29/25.42 |

OTHER PUBLICATIONS

Japanese Language Periodical "National Technical Report", vol. 26, No. 2, Apr. 1980, (Translation Enclosed).

Primary Examiner—Donald A. Griffin
Attorney, Agent, or Firm—Hill, Van Santen, Steadman & Simpson

[57] ABSTRACT

A capacitor composed of a consolidated winding or consolidated stack of plastic plies layered to one another and provided with metal coating layers has an incision at a narrow side to form projections. The metal coatings on the individual plastic plies are alternately interrupted by insulating strips from ply to ply and are alternately connected as anti-polar coatings by metal layers situated on the surfaces formed by the projections. The plastic plies have the metal layers on both sides, over which extremely thin plastic layers are applied. A method for manufacturing capacitors provides that the plastic plies be provided with the metal-free insulating strips and that they thereby or subsequently be wound onto a drum, whereupon the incisions are produced and the individual stacks are separated either before or subsequent thereto.

24 Claims, 6 Drawing Sheets

ELECTRICAL CAPACITOR COMPOSED OF A CONSOLIDATED WINDING OR CONSOLIDATED STACK OF METALLIZED PLASTIC PLIES LAYERED TO ONE ANOTHER AND METHOD FOR THE MANUFACTURE THEREOF

BACKGROUND OF THE INVENTION

FIELD OF THE INVENTION

The invention is directed to an electrical capacitor composed of a consolidated winding, or an individual consolidated stack, the winding or stack being formed of plastic plies layered to one another and provided with regenerably thin coatings of valve metal.

In particular the coatings alternately extend up to the ends of two projections from ply to ply, these projections being formed by an incision which proceeds in the direction of the thickness of the winding or of the stack, and proceeds roughly in the middle of a side thereof.

The surfaces formed by the ends of the projections in the consolidated winding, or stack, are provided with metal layers to provide electrical contacting and being manufactured by metal spraying, these metal layers connecting the coatings to one another and serving for the fastening of external power leads.

The coatings cover the surfaces of the plastic plies practically up to the edges at the longitudinal sides as well as up to the two ends of the projections and, as warranted, up to the edge of the upper narrow side of the stack which lies opposite the narrow side containing the incision;

The projections are alternately provided with metal-free insulating strips and residual metal strips from plastic ply to plastic ply.

The depth of the incision is either greater than the width of the residual metal strips or, preferably, coincides with the inner edges of the insulating strips or extends beyond these edges into the winding or into the stack in the direction of its longitudinal axis.

The invention is also directed to a method for the manufacture of such a capacitor wherein two regenerably thin, metallized bands on plastic plies, particularly comprising a corrugated cut along one edge, are layered on a drum to form an initial capacitor. The initial capacitor is divided into the desired individual capacitors perpendicular to the layer planes. For a plurality of plastic plies and coatings forming a potential mother capacitor, non-active cover plies are provided, parting plies are arranged thereon and cover plies are in turn arranged thereon and the plastic plies that have the coatings are in turn arranged thereon for the next mother capacitor. The initial capacitor which has been formed in this fashion is provided with end contact layers and is subsequently divided in the region of the intermediate parting plies and in a direction perpendicular thereto. In particular, the method steps are as follows:

(a) The two metallized bands are provided with intermittent, metal-free insulating strips before or during winding. Laser beams generate the metal-free strips in the regions of the edges of the metallized bands and spaced at intervals in a winding direction such that the insulating strips lie in a plane perpendicular to the winding axis when wound onto the drum. Both the ends as well as the beginnings of the insulating strips extend into the region of the subsequent incision or go slightly beyond this region.

(b) When being wound onto the drum, the bands are guided such that the centers of the insulating strips of the upper band are arranged symmetrically above the centers of the interstices between the insulating strips of the lower band in the finished mother capacitors.

(c) After the winding and consolidation of the initial capacitor or, respectively, the mother capacitors, and while still on the drum, at least those end faces formed by the edges are provided with a metal layer by metal spraying.

(d) Before or after dividing the initial capacitor into individual mother capacitors, incisions are made perpendicular to the winding direction in the middle between two respective cut lines from both sides of the mother capacitor. The two projections of each capacitor arise due to the width and depth of these incisions.

(e) The mother capacitors are separated into the individual capacitors — potentially after fastening power leads thereto — by making insulating saw cuts both along cut lines which proceed through the centers of the insulating strips, as well as along a cut line which lies parallel to the edges in the middle of the mother capacitor.

(f) Finally, the individual capacitors are finished by applying cap-shaped or other power leads, insofar as these were not already attached in method step e).

Capacitors which have all of these initially cited features, and methods which have the recited method steps are extensively described with respect to stack capacitors and with a broad discussion of prior art in German published application No. 3342 329, which corresponds to the European published application EP-A No. 3-0 144 857 and to U.S. Pat. 4,563,724. Corresponding wound capacitors and methods for the manufacture thereof are disclosed in German published application No. 35 17 435, and in European-A No. 3 0 201 771 and U.S. Pat. No. 4,639,832 which correspond thereto.

A variety of terms known in the art are included among those employed in describing the present invention. These terms are explained in detail in U.S. Pat. No. 4,563,724 at the respectively cited passages. Amoung these terms are: "insulating saw cut" (cf. U.S. Patent, column 3, lines 18–28 and column 7, lines 3–11 and lines 60–65), "corrugated cut" or "wavy cut" (cf. column 3, lines 50–62 and column 8, lines 55–65), "cover layers" (cf. column 7, lines 42–47), "regeneratability" (cf. column 2, lines 38–46), "Schoopage method" (cf. column 9, lines 13–19 and column 10, lines 49–52), as well as "synchronized control of the laser beam pulses" (cf. column 11, lines 27–33).

A known capacitor of the species recited and a known method for the manufacture thereof exhibit a number of major advantages which are described in U.S. Pat. No. 4,563,724 in column 4, lines 47–53; column 7, lines 12–21; and column 10, lines 24–35 and lines 63–68. More specifically, the advantages are essentially that a largely low-induction capacitor is achieved which is suitable for a grid dimension of 2.5 mm in whose manufacture the width of the bands to be wound is not subject to any manufacturing limitation and which can be manufactured in extremely high piece numbers in an especially efficient way.

Despite all of these advantages, it can be necessary to further increase the volume capacitance of such a capacitor in order to accommodate extremely high capacitances in optimally small volumes. This requirement is met in the known wound, or stacked, capacitors by applying extremely thin dielectric layers, for example in the form of lacquer layers or of plastic layers produced by glow polymerization of monomers from the vapor phase. However, the prior art known in this context provides no teaching as to how an initially recited, low-induction capacitor must be constructed in order to achieve a high volume capacitance by the use of extremely thin dielectric layers.

The prior art which is relevant in this context, thus, obviates neither the structural format nor the manufacturing method of such an improved capacitor. For example, U.S. Pat. No. 3,252,830 discloses an electrical capacitor and a method for the manufacture thereof wherein a metal layer is first applied to a carrier foil, this metal layer leaving a metal-free strip free in the region of an edge. By glow polymerization of various plastic materials recited therein, a dielectric layer is generated on this first metal layer, this dielectric layer completely covering the first metal layer and the metal-free edge strips. A second metal layer is then applied thereto, leaving a metal-free strip free at the opposite edge. The carrier band prepared in this way is wound to form a normal wound-capacitor and is contacted at the end face in the way standard for these cases. This electrical wound capacitor includes two power lead wires proceeding in an axial direction.

The U.S. Pat. No. 3,252,830 (cf. column 6, lines 7-15) also contains the teaching that various other forms are possible as wound, flat or multi-layer structures, whereby, as an example, flat multi-layer capacitors could be employed for a low-voltage capacitor having a high capacitance. A parallel circuit is formed in such capacitor, whereas a corresponding series circuit is recommended for high-voltage capacitors. Even given knowledge of the aforementioned U.S. Pat. No. 4,563,724, a person skilled in the art is not lent a teaching toward low-inductive capacitors of the species initially cited and the manufacturing method comprising all the recited advantages.

The situation is the same in the case of U.S. Pat. No. 3,069,283, which discloses a more efficient method for the manufacture of wound capacitors. Namely, it is not a single carrier band that is pre-treated but, rather, a carrier band whose widths amounts to a multiple of the width required for the later wound capacitor. In this rationalized manufacturing method, strips proceeding in a band direction which leave intermediate surfaces free are first applied to the carrier foil upon employment of masks. Taking certain, mutual dislocations into consideration, extremely thin plastic films are then applied to these strips by glow polymerization, the plastic films being likewise applied in strip form. Finally, metal for the cooperating electrodes is applied in strip form, likewise taking certain dislocations into consideration. The band prepared in this way is then divided into individual bands in the band direction, and individual wound capacitors are then manufactured therefrom.

Figure 2:
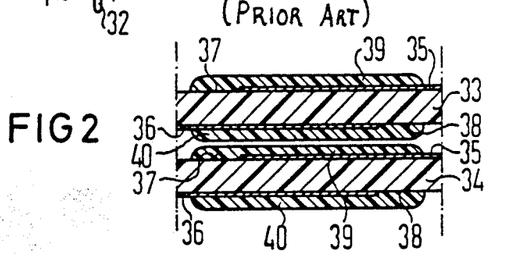
FIG. 2 is a cross section of a portion of a capacitor of the prior art.
Figure 3:
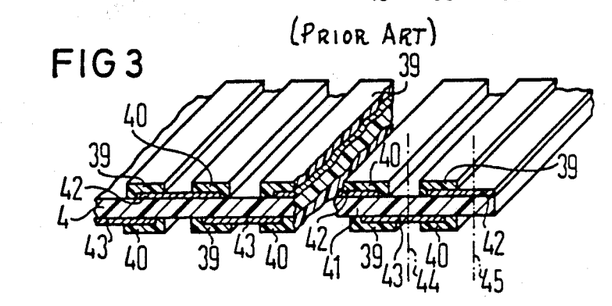
FIG. 3 is a perspective view, partially in cross section, of a manufacturing step of the capacitor of the prior art for a capacitor of FIG. 4.
Figure 4:
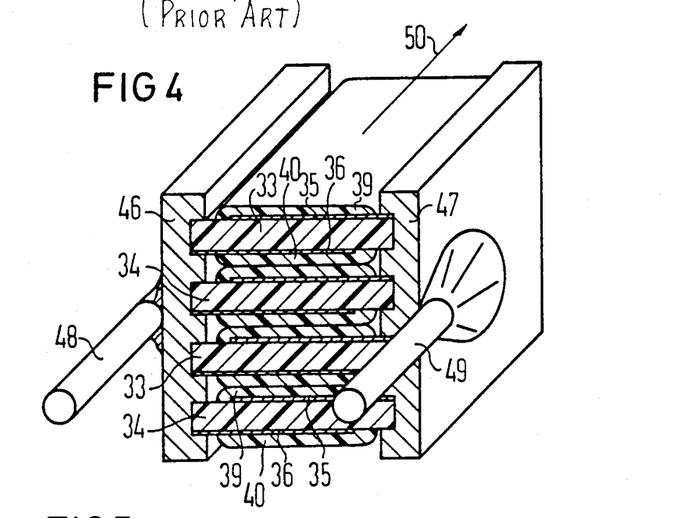
FIG. 4 is a perspective view of a capacitor included in the prior art.

The Japanese periodical "National Technical Report", Vol. 26, No. 2, April 1980, pages 231-236 describes a capacitor having the designation "TF-capacitor ECQ-V" whose manufacturing method and whose structure are explained in conjunction with the enclosed FIGS. 2, 3 and 4. This capacitor is a normal stacked capacitor which — with the exception of the additionally provided, extremely thin lacquer layers — was admitted as prior art in the specification of U.S. Pat. No. 4,563,724 (cf col. 7, lines 39-65 and FIG. 5 therein).

In contrast to the disclosed capacitors having extremely thin plastic layers of glow polymer, the known "TF-capacitors" contain layers of lacquer, particularly of polycarbonate lacquer, as extremely thin layers and place the carrier members in the field space because metal-free insulating strips are present at opposite edges of the carrier. Due to the considerably thicker carrier layers in comparison to the lacquer layers or given employment of carrier layers that are likewise thin, however, the reducing influence on the volume capacitance is not very great and is accepted. Neither viewed by itself nor in combination with other prior art, thus, does the Japanese periodical provide a teaching of low-induction capacitors with an increased volume capacitance.

German AS No. 22 27 751, which corresponds to U.S. Pat. No. 3,855,507, discloses an electrical wound or stacked capacitor and methods for the manufacture thereof. This capacitor is regenerable, having carrier foils metallized on both sides in the field-free space and contains intermediate layers under the metal coatings. Extremely thin dielectric layers of plastic manufactured by lacquering are provided above the metal coatings, these dielectric layers of plastic cover the metal coatings up to the edge and potentially extending up to the end faces. Metal drops are applied to an end face contact layer, which penetrate the extremely thin dielectric layers without further ado as a result of their kinetic energy and their temperature. Nonetheless, these capacitors must have edge regions alternating at opposite face ends which are free of the metal of the coatings, so that this publication likewise provides no teaching as to how one should proceed in order to obtain low-induction capacitors of the species under consideration here.

SUMMARY OF THE INVENTION

The Apparatus

An object of the present invention is to improve the known, low-induction stacked capacitors such that an increased volume capacitance once is achieved and all electrical, structural and methodological advantages are thereby preserved.

Another object of the invention is to specify a method for the manufacture of such a capacitor which is just as simple to execute as the known methods and which nonetheless leads to low-inductive capacitors having increased volume capacitance.

In order to achieve these and other objects, a capacitor of the species initially cited is inventively characterized by the following features:

(a) Regenerably thin metal layers are present as coatings on both surfaces of each and every plastic ply.

(b) Furthermore, an extremely thin plastic layer is provided as a dielectric on one or on both coatings of every plastic ply, or on both coatings of every second plastic ply. The extremely thin plastic layer generally completely covers the coating, extends into the region of the residual metal strips, and is at least partially removed above the insulating strips.

In addition to the advantages of a low-induction capacitor already set forth in the description of the prior art, the capacitor of the present invention offers the further advantages that a considerable increase in the volume capacitance is achieved and that the regenerably thin metal layers can initially completely cover the two surfaces of each and every plastic ply, so that templates and coverings in the application of the metal layers are no longer required when preparing the individual bands. Further, the capacitor offers the additional advantage that the extremely thin plastic layer can also completely cover the metal layer under certain conditions, so that the manufacture-produced advantage of avoiding templates and coverings also results here. In both cases — but particularly given the complete metallization of both surfaces of the bands — the problem of observing cutting tolerances within the strips generated by covering does not occur.

The extremely thin plastic layers are advantageously produced by a lacquering process and are composed of acetyl cellulose, polycarbonate or epoxy resin lacquer. It is especially advantageous when the extremely thin plastic layers are manufactured by glow polymerization and, for example, are composed of a mixture of perfluorated and pure hydrocarbons. The extremely thin plastic layers each have a thickness of 0.1 through 2.0 $\mu$m, and preferably 0.7 $\mu$m, in the case of lacquer layers, and each have a thickness of 0.05 through 0.7 $\mu$m, and preferably 0.2 $\mu$m, in the case of glow polymerization layers.

The thickness of the plastic plies amounts to 1 through 15 $\mu$m, and preferably 2 $\mu$m. Suitable as materials for these plastic plies are, for example, polyethyleneterephthalate, polypropylene, polyphenylenesulfide (PPS), polyimides or copolymers of polyimides with polyamides and similar plastics.

In accordance with a development of the invention, the first insulating strips on every plastic ply are situated on a projection and the second insulating strips are situated on the diametrically opposite side of the other projection. In this case — which can be employed particularly for extremely thin plastic plies —, the plastic plies, just like the dielectric layers, lie in the field space. This embodiment shall be set forth in conjunction with FIGS. 5, 14 and 15.

A preferred development of the invention has both the first insulating strip as well as the second insulating strip on a respective plastic ply situated at both sides of the one projection. Both the first insulating strip, as well as the second insulating strip on a respectively next plastic ply, are situated at both sides of the other projection. In this case — which shall be set forth in conjunction with FIGS. 6 and 16 through 18 —, the plastic plies are situated in the field-free space. This embodiment is especially advantageous when the dielectric layers are especially thin and, for example, are composed of glow polymer.

An especially advantageous embodiment of the invention is provided with the extremely thin plastic layer extending up to the ends of the projections and the cut edge of the projections being formed as a corrugated or wavy cut at least every second plastic ply. While the known application of corrugated or wavy cuts at the edges of the plastic plies forming the end face is not absolutely necessary for increasing the contacting reliability in other embodiments of the present invention — but can be advantageously applied when a lateral offset of the foils as disclosed by U.S. Pat. No. 3,855,507 is not adequate —, the utilization of corrugated or wavy cut edges is absolutely necessary in the embodiment recited here wherein the extremely thin plastic layer extends up to the ends of the projections.

An especially advantageous embodiment of the corrugated or wavy cut edges is disclosed in German published application No. 35 10 518 and corresponding U.S. Pat. No. 4,635,164 and can be utilized in the present instance. In this embodiment, the corrugated or wavy cut edges are present at only every second plastic ply. Due to the appropriate, lateral offset of the plastic plies relative to one another, adequate possibilities are established for the metal drops of the contacting layers at the end face to reach the respective metal layers of the coatings.

In another embodiment of the invention, the coatings of every plastic ply do not extend up to the upper narrow side and, thus, leave an insulating strip free at the face end formed there. This insulating strip extends up to a boundary line. This embodiment is of significance when no insulating saw cut is made at this narrow side and/or when the stability of the consolidated stack is to be increased by a Schoopage process which is also carried out to apply a metal layer to the end face lying opposite the contacting end face. Without such insulating strips at this narrow side, layers applied by metal spraying would completely short the capacitor.

It is advantageous in all instances of the present invention when the consolidated stack is provided with at least one respective cover layer above its plastic plies lying at the outside. This cover layer is constructed in the same fashion as the plastic ply but with insulating strips present on both sides of both projections. This fashion of manufacturing cover layers is set forth in detail in German published application No. 35 17 243 (filed on 13 May, 1985) and correspondidng U.S. Pat. No. 4,667,382. In particular, in the manufacturing method of the initial or, respectively, mother capacitors, bands prepared from the plastic plies are first wound having continuous metal-free strips generated on both sides until at least one or two complete revolutions of the drum have occurred. Following thereupon, the intermittent metal-free insulating strips are produced in the specified way, and finally, continuous demetallization is again carried out for at least one or two revolutions of the drum.

The Method

The initially cited method for manufacturing a capacitor of the invention is inventively characterized in that a band is provided being significantly broader in comparison to the width later required. This wide band is composed of a plastic ply that is completely provided with regenerably thin metal layers (aluminum or zinc or alloys thereof) as coatings on both sides. An extremely thin plastic layer is subsequently applied to the entire surface of at least one of these metal layers, being applied in accord with the known methods by a lacquering process or by glow polymerization. The wide band prepared in this way is then divided into individual bands having the width necessary for drum winding. The division of the band is made by cuts proceeding in the longitudinal direction of the band, a known cutting apparatus which produces corrugated or wavy cut edges being preferably utilized for this purpose.

A development of the present method is that the extremely thin plastic layer to be applied to at least one metal layer is applied in the form of strips proceeding in a longitudinal direction of the band, thereby leaving intermediate surfaces free. The wide band is then divided into individual bands along the centers of these intermediate surfaces, so that these individual bands have edge regions that are free of the plastic layer. This method modification is set forth in conjunction with FIGS. 8, 9a and 9b.

Another modification of the method is that the metal layers to be applied to the broad band are applied in the form of strips proceeding in a longitudinal direction of the band and leaving intermediate surfaces free, these strips lying opposite one another. The band is then divided into the individual bands in the centers of the intermediate surfaces and in the centers between the intermediate surfaces. This modification of the method serves the purpose of manufacturing capacitors that are set forth in conjunction with FIGS. 5, 8, 9a, 9b and 10.

Insofar as the significantly broader bands are completely provided with regenerably thin metal layers at both sides and the extremely thin plastic layers also completely cover the metal layers, the advantages of the method in the capacitors of the invention have already been set forth above.

Insofar as the extremely thin plastic layer to be applied to at least one metal layer is applied in the form of strips leaving intermediate surfaces free proceeding in a longitudinal direction of the band, then the advantage results in the achievement of a reliable electrical contacting at the end faces of the capacitor which are formed from the edges of the plastic plies. This is particularly true of capacitors wherein the extremely thin plastic layer is applied by a lacquering process in a layer which is not especially slight in thickness.

Insofar as the metal layer to be applied to the broad band is applied in the form of strips proceeding in a longitudinal direction of the band and leaving intermediate surfaces free, templates or coverings are required for this purpose. The advantages nonetheless derive in that these metalfree insulating strips proceed to that end face lying opposite the end face serving the purpose of contacting, so that a metal layer for solidification of the stack can likewise be applied there by metal spraying (Schoopage) and/or that an insulating saw cut need not be undertaken there.

Although the invention is specifically directed to stacked capacitors, it can obviously also be applied in wound capacitors such as those disclosed in German published application No. 35 17 435 and in the corresponding European Patent No. 0 201 771 and U.S. Pat. No. 4,639,832, in which the methods thereby to be applied are also explained.

DESCRIPTION OF THE PREFERRED EMBODIMENTS

Figure 1:
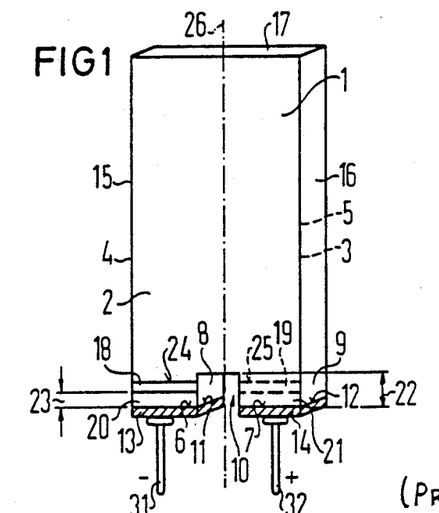
FIG. 1 is a perspective view of a capacitor of the invention, but without encapsulation which is provided in a known way in the standard case.

FIG. 1 shows a consolidated stack 1 which is composed of plastic plies 4 and 5 layered on one another and provided with regenerably thin layers of valve metal of, for example, aluminum or zinc or alloys of these metals, as coating layers 2 and 3. Two projections 8 and 9 are formed by an incision 10 which is made in the direction of the thickness of the stack 1, i.e. generally perpendicular to the plane of the drawing. The incision 10 proceeds roughly in the middle of one side of the stack 1. Every plastic ply 4 and 5, accordingly, has the projections 8 and 9.

Metal-free insulating strips 18 and 19 are provided alternating from plastic ply 4 to plastic ply 5, so that the coatings 2 on the plastic plies 4 are electrically insulated from remaining residual metal strips 20. In the same way, the coatings 3 on the plastic plies 5 are electrically insulated from residual metal strips 21 by insulating strips 19. At the respectively other projections 8 and 9, the coatings 2 on the plastic plies 4 or, respectively, the coatings 3 on the plastic plies 5 extend up to ends 7 or, respectively, 6 of the projections 8 and 9. Surfaces 11 and 12 formed by the ends 6 and 7 of the projections 8 and 9 in the consolidated stack 1 are provided with metal layers 13 and 14 manufactured by metal spraying. The metal layers 13 and 14 connect the coatings 2 or, respectively, the coatings 3 to one another homopolarly and serving the purpose of fastening external power leads 31 and 32. As in the illustrated exemplary embodiment, the power leads 31 and 32 are fashioned as power lead wires. However, it is also possible to attach caps (not shown) or some other form of power leads for connection to the interconnects of an electrical circuit.

A depth 22 of the incision 10 measured from the surfaces 11 and 12 of the projections 8 and 9 is such that the necessary, mutual insulation of the coatings 2 or, respectively, 3 from one another is guaranteed. The depth 22 is, thus, at least greater than a width 23 of the residual metal strips 20 or, respectively, 21. The depth 22 can extend to inner edges 24 and 25 of the insulating strips 18 and 19. Preferably, however, the depth 22 is greater than the sum of the width 23 of the residual metal strips 20 or, respectively, 21 and the width of the metal-free insulating strips 18 or, respectively 19. The depth 22 of the incision 10 extends in the direction of a longitudinal axis 26 of the stack 1.

On the individual plastic plies 4 or, respectively 5, the coatings 2 or, respectively 3 cover the surfaces of the plastic plies 4 and 5 practically up to their edges at longitudinal sides 15 and 16. The coatings 2 and 3 may extend up to the edge of an upper narrow side 17 of the stack 1, and up to the two ends 6 and 7 of the projections 8 and 9 insofar as they are not interrupted by the insulating strips 18 and 19.

The prior art coming closest to the present invention shall be set forth in FIGS. 2, 3 and 4 with reference to what are referred to as "TF-capacitors". FIG. 2 shows portions of the structure of a prior art capacitor, whereby 2.5 m thick plastic plies 33 and 34 are provided with regenerably thin metal coatings 35 and 36 at both sides such that metal-free insulating strips 37 and 38 are present at every plastic ply 33 and 34 in diametrically opposite edge regions. The coatings 35 and 36 are each coated with lacquer layers 39 or, respectively, 40 of about 0.9 m thickness to serve as a dielectric. The lacquer layers 39 and 40 do not extend up to the edges of the plastic plies 33 and 34 toward the right and left, relative to FIG. 2. Thus, the metal-free insulating strips 37 and 38 are also coated with lacquer layers.

FIG. 3 shows that a plastic band 41 which is significantly broader than the bands to be wound later is first provided with strip-shaped metal layers 42 and 43 proceeding from both sides. In a further work step, extremely thin plastic layers 39 and 40 are then applied to the strip-shaped metal layers 42 and 43 by a lacquering process. The application of the plastic layers 39 and 40 proceeds from both sides such that the metal layers 42 and 43 each have a region in their middle which is free of the plastic layers 39 and 40. The plastic layers 39 and 40 extend from this free region to beyond the edges of the metal layers 42 and 43. The broader plastic band 41 is then divided, for example, along cut lines 44 and 45 so that individual bands result. Two such bands are later wound with one another in accordance with the arrangement of FIG. 2.

The known "TF-capacitors" can, for example, be manufactured according to a method disclosed in the aforementioned U.S. Pat. No. 4,563,724 in column 2, lines 16 through 37 and in column 7 beginning with line 36 through column 8, line 46, i.e. the individual bands supplying the plastic plies 33 and 34 can be wound onto the drum in the direction of an arrow 50 (FIG. 4) after appropriate preparation.

FIG. 4 shows that the coatings 35 at the right-hand side in the drawing and the coatings 36 at the left-hand side in the drawing are electrically connected to one another by metal layers 46 and 47 produced in the Schoopage process at the opposite end faces of the capacitor. This results in both the plastic plies 33 and 34 as well as the lacquer layers 39 and 40 lying in the electrical field of the capacitor. Power lead wires 48 and 49 are secured to the Schoopage layers 46 and 47 in a suitable way, for example, by soldering or by welding. It can be seen from FIG. 4 that the power lead wires 48 and 49 proceed parallel to the winding direction 50, namely proceeding from mutually opposite end faces of the capacitor.

The capacitors of the present invention differ fundamentally from stacked capacitors comprising extremely thin dielectric layers belonging to the prior art, as proceeds from the following description of FIGS. 5 through 18. Insofar as these figures show parts corresponding to one another, the same reference characters are likewise employed therefor.

Figure 5:
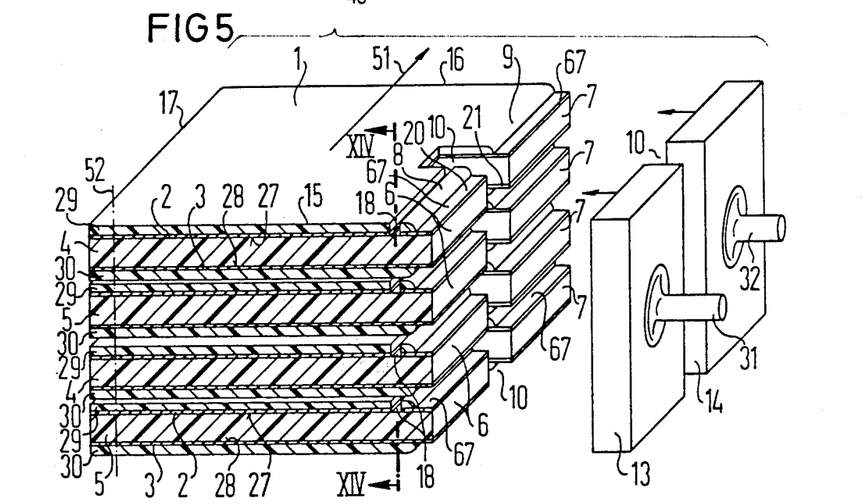
FIG. 5 is a perspective exploded view of a structural format of a capacitor of the present invention.

In FIG. 5, the power lead wires 31 and 32 proceed parallel to one another and proceeding from only one end face in the capacitors of the present invention. This is in contrast to the known stacked capacitors comprising extremely thin dielectric layers on the coatings. As in the low-inductance capacitors described in the aforementioned U.S. Pat. No. 4,563,724, the bands supplying the individual plastic plies 4 and 5 here are wound such — as shall be explained later — that they proceed in the direction of an arrow 51, whereby the power lead wires 31 and 32 in the finished capacitor are arranged perpendicular to the winding direction 51.

FIG. 5 shows the metal layers 13 and 14, which have been manufactured by the Schoopage process, spaced at a distance from the contacting end face in order, first, to illustrate the position of these metal layers 13 and 14 with respect to the capacitor and, second, not to disrupt the illustration of the structural format of this capacitor. It may be seen from FIG. 5 that, in the present case, two plastic plies 4 alternate with two plastic plies 5. The coatings 2 and 3 in the form of regenerably thin metal layers are applied to surfaces 27 and 28 of the plastic plies 4 and 5 and completely cover the surfaces 27 and 28, i.e. up to the narrow side 17, up to the longitudinal sides 15 and 16 and up to the ends 6 or 7 of the projections 8 or, respectively 9 which have arisen due to the incision 10.

Extremely thin plastic layers 29 and 30 have been applied over the coatings 2 and 3, in such fashion in the present case that these plastic layers 29 and 30 in the region of the projections 8 or, respectively 9 do not extend up to the ends 6 or, respectively 7 of the projections 8 and 9.

During manufacture of the capacitors, the metal-free insulating strips 18 are produced on the projection 8 with a laser beam proceeding from the upper side. The metal-free insulating strips 19 on the diametrically opposite, lower side of the plastic layers 4 on the projection 9 are likewise produced by laser beams during manufacture. In both instances, residual metal strips 20 or, respectively 21 have been formed. The metal layer 13 then connects the coatings 3 to one another at the projection 8, whereas the metal layer 14 connects the metal coatings 2 to one another at the projection 9.

Figure 6:
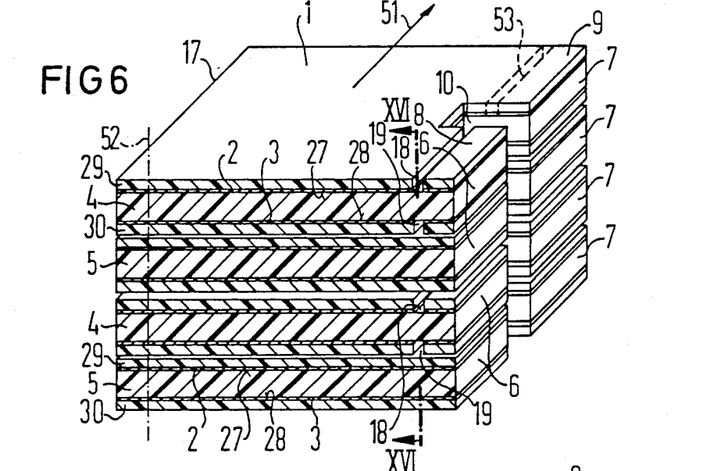
FIG. 6 is a perspective view of another embodiment of the structural of a capacitor of the invention.

Let it be pointed out here that the clearances shown in FIGS. 5 and 6 between the extremely thin plastic layers 29 and 30 are, of course, not present in the finished capacitor but are shown here to more clearly illustrate the invention. A boundary line 52 in FIGS. 5 and 6 is intended to indicate the possibility that the coatings 2 and 3 in one embodiment extend only up to the boundary line 52, so that metal-free insulating strips or areas are present between the ends of the coatings 2 and 3 and the upper narrow side 17. This possibility is set forth in more detail in conjunction with FIGS. 8 through 10.

In the manufacture of the metal-free insulating strips 18 and 19 with laser beams, the extremely thin plastic layer, 29 and 30, respectively, in this de-metallized region are also usually eliminated due to the energy of the laser beams. This condition is described herein by providing that the extremely thin plastic layers 29 and 30 are at least partially removed above the insulating strips 18 and 19.

For reasons of clarity, the metal layers 13 and 14 and the power lead wires 31 and 32 shown in FIG. 5 are omitted in FIG. 6. In the following, only the differences in the capacitor of FIG. 6 over the capacitor of FIG. 5 shall be set forth. At the uppermost plastic ply 4, one difference is that this uppermost plastic ply 4 also acts as a cover layer due to the provision of a metal-free insulating strip 53 shown in broken lines on the projection 9. This insulating strip 53 is also present on the underside of the projection 9 of the uppermost plastic ply 4, so that the uppermost ply 4 acts as a non-active cover layer because the metal-free insulating strips 18 and 19 are already a present on its projection 8 on both sides. As a result thereof, the metal coatings 2 and 3 of this uppermost plastic ply 4 are not electrically connected to the metal layer 13 and 14. This approach to manufacturing cover layers is already disclosed in detail in the aforementioned German published application No. 35 17 243. And corresponding U.S. Pat. No. 4,667,382.

A further difference of the capacitor of FIG. 6 over the capacitor of FIG. 5 is that both the first metal-free insulating strip 18 as well as the second metal-free insulating strip 19 on each of the plastic plies 4 are situated at both sides of the plastic plies 4 at the projection 8, whereas both the first insulating strip 18 as well as the second insulating strip 19 on each of the respectively next plastic plies 5 are situated at both sides of the plies 5 at the other projection 9. A further difference is that the extremely thin plastic layers 29 and 30 extend up to the ends 6 and 7 of the projections 8 and 9 on every plastic ply 4 and 5.

Figure 7A:
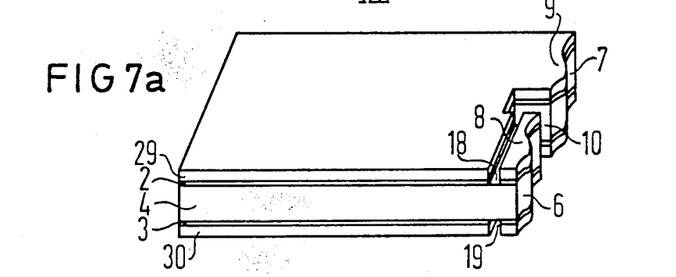
FIG. 7a is a perspective view of a ply of a capacitor of FIG. 6.
Figure 7B:
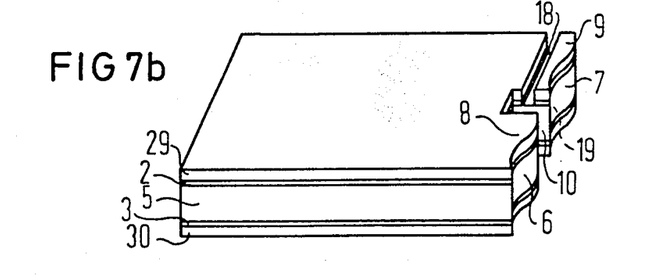
FIG. 7b is a perspective view of an adjacent ply to the ply shown in FIG. 7a which make up the capacitor of FIG. 6.

FIGS. 7a and 7b show two successive plastic plies 4 and 5 having the coatings 2 and 3 and the extremely thin plastic layers 29 and 30, the plies 4 and 5 being separated for greater clarity. The grooves which usually arise due to the plastic material which is removed during the laser process may be clearly seen above the metal-free insulating strips 18 and 19. The metal-free insulating strips 18 and 19 — lying opposite one another at both sides of the projections 8 or, respectively 9 — are generated by a single laser beam which, passing through the ply, eliminates the metal-free insulating strip 19 at the radiation exit side in strip-form simultaneously with the formation of the metal-free insulating strip 18. The ends 6 and 7 of the projections 8 and 9 are shown as a corrugated or wavy cut in FIGS. 7a and 7b. It can be seen that the waviness in the plastic ply 4 differs from the waviness in the plastic ply 5. Adequate possibilities exist for especially good contacting between the metal drops applied in the Schoopage process and the coatings 2 and 3. The application of the corrugated or wave cut is known, as already set forth above, and is likewise disclosed in the aforementioned German published application No. 35 10 518.

The embodiment of FIGS. 6, 7a and 7b is especially advantageous because only the extremely thin plastic layers 29 and 30 lie in the field space, whereas the plastic plies 4 and 5 remain field-free. Furthermore, the manufacture of this capacitor is especially simple because the significantly broader bands from which the narrow individual bands are formed can be completely coated with metal at both sides when being prepared. The extremely thin plastic layers are likewise applied over the entire width of the wide bands. Also, the metal-free insulating strips 18 and 19 on the plastic plies 4 and 5 are each generated with a single laser beam. Thus, manufacturing of this embodiment is greatly simplified. This embodiment is especially advantageous when the extremely thin plastic layers 29 and 30 are produced by glow polymerization of plastics from the vapor phase so that dielectric layers, which are also referred to as plasmapolymer layers, thereby arise. Such glow polymer layers can be thinner than lacquer dielectric layers.

Figure 8:
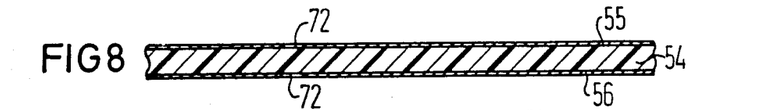
FIG. 8 is a cross section of a plastic band metallized at both sides for the manufacturing method of the invention.
Figure 9A:
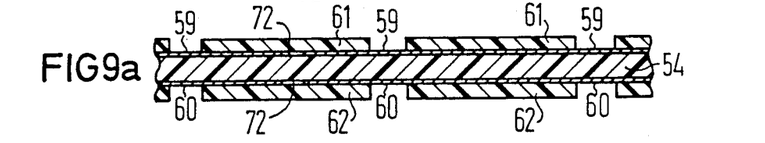
FIGS. 9a and 9b are cross sections showing steps in the manufacturing method of a capacitor of the invention according to FIG. 5.
Figure 9B:
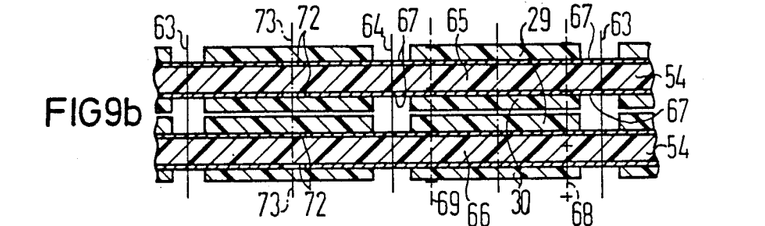
Figure 10:
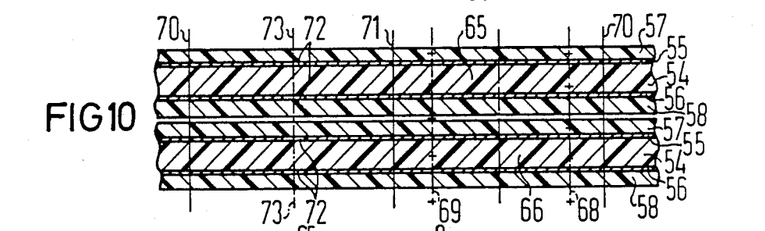
FIG. 10 is a cross section showing a step of the manufacturing method for a capacitor of the invention according to FIG. 6.

The inventive manufacturing method and various modifications thereof shall now be set forth with reference to FIGS. 8 through 12. FIGS. 8 through 10 show that broad plastic band 54, as adequately known per se, can be utilized for the manufacture of the capacitors of the invention, the width of the plastic band 54 amounting to a multiple of the width later required for the capacitors. In accordance with FIG. 8, the plastic band 54 is provided with regenerably thin material layers 55 and 56 on both sides in accordance with known methods. As shown in FIG. 10, the extremely thin plastic layers 57 and 58 are now applied to the bands 54 prepared in such fashion. The plastic layers 57 and 58 are applied over the entire width of the band 54 by means of a lacquering process or by means of glow polymerization.

On the other hand, it is possible (see FIGS. 9a and 9b) to apply extremely thin plastic layers in the form of strips 61 and 62 proceeding in a longitudinal direction of the band 54 and leaving intermediate surfaces 59 and 60. The band 54 is then divided into individual bands 65 and 66 along centers 63 and 64 of the intermediate surfaces 59 and 60. The individual bands 65 and 66, thus, contain edge regions 67 which are free of the plastic layers 29 and 30. At least two such bands 65 and 66 are wound to form mother capacitor rings or to form initial capacitors composed of a plurality of mother capacitor rings. During this winding process, the metal-free insulating strips 18 and 19 are produced later by laser beams in insulating strip regions 68 and 69 which are identified by lines composed of dashes and crosses in FIG. 9b. The two bands 65 and 66 to be wound on top of one another roughly correspond to the bands shown in FIG. 11.

FIG. 10 shows two broad plastic bands 54 each of which has been coated with the metal layers 55 and 56 on both sides and each of which has likewise been completely coated with the extremely thin plastic layers 57 and 58. Two bands 65 and 66 are formed by division along cut lines 70 and 71 in a band running direction, or longitudinal direction, whereby the distance between the cut lines 70 and 71 is now arbitrary and can be selected variably for the width later desired. In other words, the cut lines be made anywhere without regard to intermediate surfaces between strips of plastic layers. Cutting tolerances with respect to a cut line which proceeds within metal-free strips proceeding in the bands longitudinal direction or which proceeds in strips free of glow polymer due to covering or masking now no longer have to be observed. The insulating strip regions 68 and 69 are also shown in FIG. 10. These, however, can be arranged even closer to the cut lines 70 and 71 so that the capacitatively active surface is enlarged.

FIGS. 8, 9a, 9b and 10 each also show insulating intermediate surfaces 72 between metal strips at their left-hand parts. The insulating surfaces 72 are required when metal-free insulating strips up to the boundary line 52 described in FIGS. 5 and 6 are required at the upper narrow side 17 of the consolidated stack 1. For example, the insulating surfaces are required when an insulating saw out is not carried out along the narrow side 17 and/or when a metal layer is also to be applied by the Schoopage process at this narrow side 17 for potentially further increasing the stability of the consolidated stack 1. In this case, the metal layers 55 and 56 to be applied to the broad band 54 are applied in the form of strips proceeding in a longitudinal direction of the band 54 and leaving the intermediate surfaces 72 free, these strips lying opposite one another. The band 54 is then divided into individual bands 65 and 66 at centers 73 of the intermediate surfaces 72 and in the centers between two of the intermediate surfaces 72, whereby these centers between the intermediate surfaces 72 (cf. FIG. 9) can correspond to the centers 63 or, respectively 64 of the intermediate surfaces 59 or, respectively, 60 or (cf. FIG. 10) can correspond to the cut lines 70 and 71. Of course, no metal-free insulating strips 18 or, respectively 19 are generated in the proximity of the metal-free strips 72.

When the pre-conditions with respect to the requirement of insulating strips in the region of the upper narrow side 17 of the consolidated stack 1 are present, however, it is also possible that continuous metal-free insulating strips be generated at both sides when the metallization layers would otherwise extend up to this narrow side. The continuous metal-free strips are similar to those already set forth in the context of the manufacture of cover layers. The intermittent metal-free insulating strips are generated at the other band side. In such a case, too, a metal layer could be manufactured at the upper narrow side 17 on the basis of the Schoopage process and an insulating saw cut would not be required.

Figure 11:
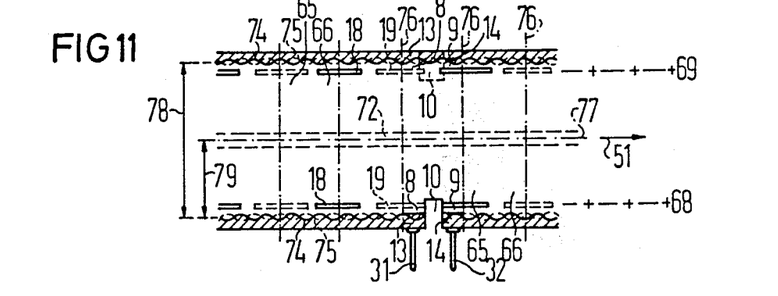
FIG. 11 is a plan view of two layers of the plastic plies to be wound and arranged above one another.

In FIG. 11, which practically corresponds to FIG. 6 of U.S. Pat. No. 4,563,724 in combination with FIG. 3 therein and for which the explanations of the method therein also apply, (cf. column 8, beginning with line 42 through column 9, line 42 and column 10, lines 36-62), an upper metallized band 65 and a lower metallized band 66 are shown. In this case, each of these two bands are provided with corrugated or wavy cut edges 74 and 75 at both edges. During or shortly before the winding of these two bands 65 and 66 — this being set forth in conjunction with FIG. 12 —, the intermittent metal-free strips 18 and 19 are generated by applying laser beams, namely on every band either from only one side or simultaneously from both sides on every band and lying opposite one another, as already set forth in conjunction with FIGS. 5 and 6. The spacings of the intermittent metal-free insulating strips 18 and 19 from one another are dimensioned such that the described projections 8 and 9 arise due to the incision 10 into the finished mother capacitor and due to the division of this mother capacitor along parting lines 76, which proceed transversely relative to the winding direction, and along a parting line 77 which proceeds in the winding direction of the band.

FIG. 11 also shows that the metal layers 13 and 14 required for the electrical contacting and for the application of the external power leads 31 and 32 are applied to the face ends of the mother capacitor formed by the corrugated or wavy cut edges 74 and 75. The width 78 of the bands 65 and 66 is also shown in FIG. 11. One can see that two capacitors arise per separation at the parting lines 76, these capacitors being divided into individual capacitors at the parting line 77.

When, as set forth in conjunction with FIGS. 8 through 10, metal-free insulating strips are generated at the intermediate surfaces 72 and when a division is carried out in the centers 73 of these intermediate surfaces 72, then bands having a width 79 result. This width 79 is only half as large as the width 78 (leaving cutting losses due to sawing out of consideration) so that the mother capacitor only has to be divided along the parting lines 76.

When parting along the parting lines 76 and 77, what is referred to as an insulating saw cut is performed, the necessary edge insulation being thereby generated, as known per se. The same is true for the edge insulation in the region of the incision 10.

Figure 12:
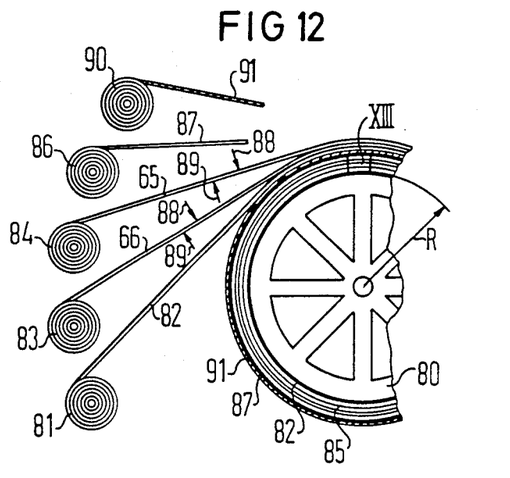
FIG. 12 is an elevational side view showing the winding method for the manufacture of a capacitor of the invention.

FIG. 12 shows a winding wheel or drum 80 whose radius R amounts to a length of from 25 to more than 50 cm in practice. Also shown is that a lower cover layer 82 is first wound onto the winding wheel 80 from a supply reel 81 and that a lower metallized plastic band 66 and an upper metallized plastic band 66 are then wound thereon from supply reels 83 and 84 until a mother capacitor ring 85 is formed, onto which an upper cover layer 87 is wound from a supply reel 86. Instead of the lower and upper cover layers 82 and 87, of course, cover layers can also be produced, as already set forth, by continuous metal-free insulating strips being generated on the bands 65 and 66 for at least one revolution of the winding wheel or drum 80.

During the winding of the bands 65 and 66, the intermittent, metal-free insulating strips 18 and 19 are generated by synchronous control of laser pulses. Appropriate program-controlled devices (not shown in the drawing but known per se) generate and direct laser beams 88 and 89 onto the bands 65 and 66 in synchronization with the revolution of the winding wheel or drum 80. As needed, the laser beams 88 thereby respectively act on the bands 65 and 66 proceeding from above, whereas the laser beams 89 correspondingly act on the bands 65 and 66 from below. Only one respective laser beam 88 is required for the embodiment of the capacitor set forth in conjunction with FIG. 6. This laser beam 88 simultaneously generates the metalfree insulating strips above and below each and every band proceeding from one side insofar as the plastic bands 65 and 66 are transmissive for laser beams. For example, the bands 65 and 66 of polyethyleneterephthalate or polypropylene are laser transmissive.

A parting layer 91 is then wound on the upper cover layer 87 proceeding from a supply reel 90, so that one can then begin with the manufacture of a further mother capacitor ring, as shown in FIG. 12. This process can be repeated until an initial capacitor composed of a plurality of mother capacitor rings has arisen. While still on the winding wheel 80, the end faces of the mother capacitors are completely provided with metal layers in the Schoopage process in one work step. Only then are the individual mother capacitor rings taken from the initial capacitor along the parting layers 91 and processed in a known fashion. As defined herein, an initial capacitor can include only one or a plurality of mother capacitor rings.

Figure 13:
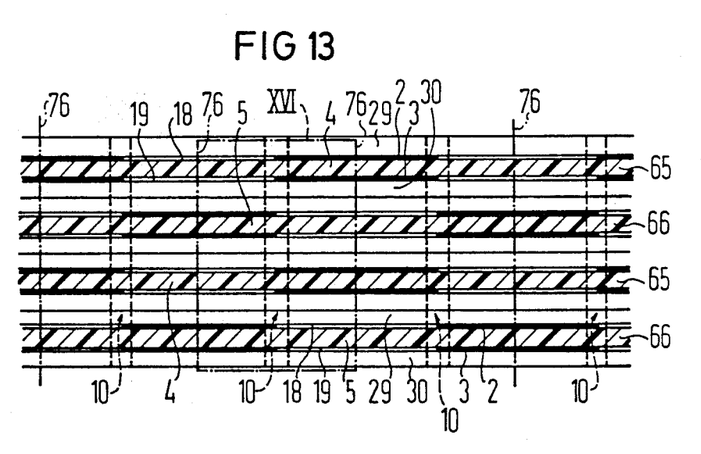
FIG. 13 is a considerably enlarged section through sector XIII of FIG. 12.

FIG. 13 shows the portion XIII in FIG. 12 of the mother capacitor 85, whereby the cover layers 82 and 87 have been omitted and the curvature has also been omitted in the illustration because the length of this portion is actually extremely short in reality in comparison to the radius R of the winding wheel 80. The portion XIII shows a section corresponding to a plane that is referenced by the line XVI—XVI in FIG. 6. One can see the upper and lower metallized plastic bands 65 and 66 which form the plastic plies 4 and 5 having the coatings 2 and 3 and the extremely thin plastic layers 29 and 30 in the portion XVI which is limited by the cut lines 76 (cf. FIG. 11). The portion XVI shall be set forth in greater detail in conjunction with FIG. 16.

FIG. 13 also shows, in dotted outline, the incisions 10 which will be introduced later. One can see that the metal-free insulating strips 18 and 19 all extend roughly into the center of the incisions regions 10 in which the incisions are applied later. The incisions 10 cause the coatings 2 and 3 to be electrically insulated from one another from ply to ply.

Figure 14:
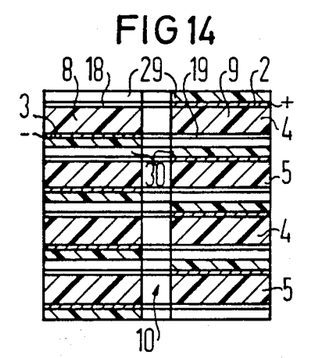
FIG. 14 is a cross section through a capacitor in a plane along the line XIV—XIV of FIG. 5.

FIG. 14 shows a section from FIG. 5 in the plane established by the line XIV—XIV. The metal-free insulating strips 18 and 19 are shown situated on the projections 8 and 9 and disposed diametrically opposite one another. The coatings 2 and 3 shown with a narrow hatching are shown in cross section, the coatings 2 or, respectively 3 being electrically connected to one another by the metal layers 13 or, respectively 14 at the ends 6 or, respectively 7 of the projections 8 or, respectively 9 (cf. FIG. 5). Both the plastic plies 4 and 5, as well as the plastic layers 29 and 30 lie in the electrical field within the capacitor. The characters "+" and "−" indicate the polarity of the electrical signal.

Figure 15:
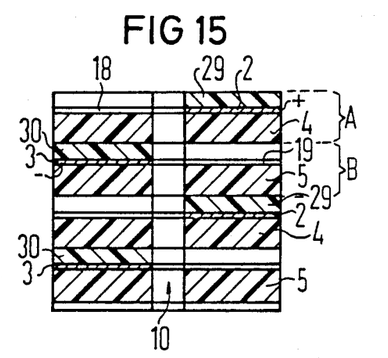
FIG. 15 is a cross section in the direction of FIG. 14 showing another embodiment of a capacitor according to the present invention.

FIG. 15 shows an embodiment wherein the plastic plies 4 and 5 are respectively provided with the metal coating layers 2 and 3 and with the extremely thin plastic layers 29 and 30 situated thereon, the coatings 2 and 3 and thin plastic layers 29 and 30 being provided on only one side of the respective plies 4 and 5. The respective band units are illustrated by the brackets A and B. In this embodiment, the dielectric between the coatings 2 and 3 is formed by the plastic ply 4 and by the thin plastic layer 30. The analogous case applies to the plastic ply 5 and the thin plastic layer 29. This embodiment is shown here in order to complete the possibilities, even though it is not especially advantageous because of the layering of an extremely thin dielectric layer on a relatively thick dielectric layer; however, it can be utilized in certain instances.

Figure 16:
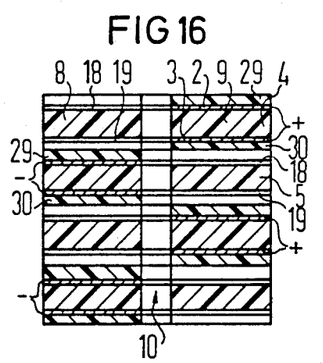
FIG. 16 is a cross section through the capacitor in the plane along line XVI—XVI of FIG. 6.

FIG. 16 shows a section through FIG. 6 in a plane established by the line XVI—XVI of the preferred embodiment. The plastic plies 4 and 5 (clearly recognizable due to the narrow hatching of the coatings 2 and 3) lie in the field-free space, whereas only the two extremely thin dielectric plies 29 and 30 are situated in the field space. This occurs in that the metal-free insulating strips 18 and 19 at every plactic ply 4 or, respectively 5 are situated at both sides of the one projection 8 or, respectively, alternating therewith, of the other projection 9. The polarities in FIG. 16 are also shown by the characters "+" and "−".

Figure 17:
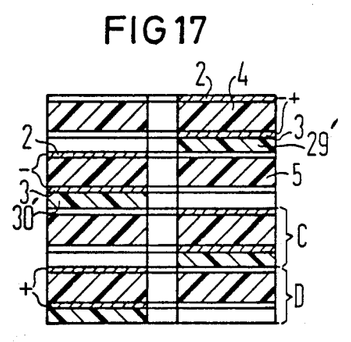
FIG. 17 is a cross section in the direction of FIG. 16 showing another embodiment of the capacitor according to the invention.

FIG. 17 differs from FIG. 16 only in that extremely thin plastic layers 29 and 30 are arranged on every plastic ply 4 and 5 only at one side above the coatings 2 and 3. The respective band units are indicated by the brackets C and D. Since the plastic plies 4 and 5 are also situated in the field-free space here, an even higher volume capacitance is achieved.

FIGS. 16 and 17 can also be viewed such that the thickness of the extremely thin plastic layers 29 and 30 in FIG. 16 is executed only half as great as the thickness of the extremely thin plastic layers 29 and 30 in FIG. 17. The extremely thin plastic layers 29 and 30 of FIG. 16, which are preferably produced by glow polymerization, are then, so to speak, separated into two sub-layers, where one respective part is allocated to one plastic ply surface. For the same operating voltage, the extremely thin individual layers of the plastic layers 29 and 30 generated by glow polymerization then have only half the thickness of the layers of FIG. 17, so that an improved contacting is possible since the Schoopage particles can more easily penetrate the comparatively even thinner plastic layers. Moreover, a significantly improved puncture strength and insulation of the capacitor is achieved by a double-layer dielectric. Viewed in economical terms, the division of a thin plastic layer into two layers thinner by half means practically no added expense since the manufacturing rate for the process of glow polymerization is inversely proportional to the thickness of the plastic layers. This means that the halved plastic layer enables twice as fast a manufacturing throughput as does an individual layer which is twice as thick.

Figure 18:
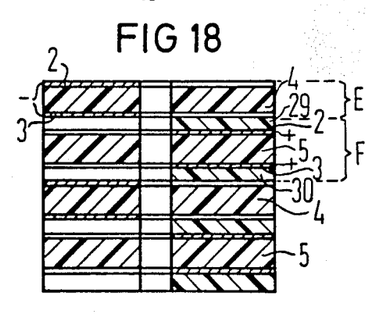
FIG. 18 is a cross section of yet another embodiment of the capacitor shown in the direction of FIG. 16.

FIG. 18 shows another modification of the structure of FIG. 17. The upper plastic ply 4 contains only coatings 2 and 3 (bracket E) which are arranged lying opposite one another at both sides of the projection 8. The plastic ply 5 contains the extremely thin plastic layers 29 and 30 (bracket F) above the coatings 2 and 3. In this embodiment, thus, bands that are only metallized at both sides alternate with bands which also contain the extremely thin plastic layers above the metallization on both sides. In this embodiment, the plastic plies 4 and 5 are situated in the field-free space, whereas the extremely thin plastic layers 29 and 20 are situated in the field space.

The possibilities of structuring the capacitors as shown in FIGS. 14 through 18 not only produce an increased volume capacitance in comparison to known stacked capacitors comprising lacquer layers or glow polymer layers, but also enable an especially simple manufacture of the capacitors of the invention.

Although other modifications and changes may be suggested by those skilled in the art, it is the intention of the inventor to embody within the patent warranted hereon all changes and modifications as reasonably and properly come within the scope of his contribution to the art.

I claim:

1. An electrical capacitor, comprising:
   a consolidated stack of plastic plies layered against one another and provided with regenerably thin layers of valve metal as coatings on both surfaces of each and every plastic ply, said coatings alternately extending up to ends of said two projections from layer to layer,
   two projections formed by an incision which proceeds in the direction of the thickness of the stack and roughly in the center of one side thereof;
   metal layers provided on surfaces formed by the ends of said projections in the consolidated stack serving the purpose of electrical contacting, said metal layers being formed by metal spraying, said metal layers connecting the coatings to one another;
   external power leads fastened to said two projections by said metal layers;

said valve metal coatings covering surfaces of said plastic plies practically up to edges at long sides of said consolidated stock as well as up to both ends of said two projections;

said two projections being alternately provided with metal-free insulating strips and residual metal strips from plastic ply to plastic ply;

said incision having a depth greater than a width of said residual metal strips: and an extremely thin plastic layer is present as a dielectric on at least one of said coatings on each of said plastic plies, said extremely thin plastic layer completely covering said coating and extending up into a region of said residual metal strips and being at least partially removed above said insulating strips.

2. An electrical capacitor according to claim 1, wherein said extremely thin plastic layer is produced by means of a lacquering process and is composed of a material selected from the group consisting of acetylcellulose, polycarbonate and epoxy resin lacquer.

3. An electrical capacitor according to claim 1, wherein said extremely thin plastic layer is manufactured by glow polymerization and is composed of a mixture of perfluoridated and pure hydrocarbons.

4. An electrical capacitor according to claim 1, wherein said extremely thin plastic layer is of a thickness of between 0.1 and 2.0 $\mu$m, and is of lacquer layers.

5. An electrical capacitor as claimed in claim 4, wherein said extremely thin plastic layer is of a thickness of approximately 0.7 $\mu$m.

6. An electrical capacitor as claimed in claim 1, wherein said extremely thin plastic layer is of a thickness of between 0.05 and 0.7 $\mu$m, and is of glow polymer layers.

7. An electrical capacitor as claimed in claim 6, wherein said extremely thin plastic layer is of a thickness of approximately 0.2 $\mu$m.

8. An electrical capacitor according to claim 1, wherein said plastic plies are of a thickness of from 1 through 15 $\mu$m.

9. An electrical capacitor as claimed in claim 8, wherein said plastic plies are of a thickness of approximately 2 $\mu$m.

10. An electrical capacitor according to claim 1, wherein first ones of said metal-free insulating strips are on each and every plastic ply and are situated on a first one of said projections, and second ones of said metal-free insulating strips are one each and every plastic ply and are situated at a diametrically opposite side of second ones of said projections.

11. An electrical capacitor according to claim 1, wherein first ones of said metal-free insulating strips as well as second ones of said metal-free insulating strips are on a respective plastic ply at both sides of one of said projections, whereas both said first ones of said metal-free insulating strips as well as said second ones of said metal-free insulating strips are on a respectively next plastic ply at both sides of a second of said projections.

12. An electrical capacitor according to claim 1, wherein said extremely thin plastic layer extends up to said ends of said projections, said projections having a cut edge executed as a corrugated cut at at least every second plastic ply.

13. An electrical capacitor according to claim 1, wherein said coatings are on every plastic ply and do not extend up to a upper narrow side and so leave an insulating strip free up to a boundary line.

14. An electrical capacitor according to claim 1, wherein said consolidated stack is provided with at least one respective cover layer above said plastic plies lying at the outside, said cover layer being constructed in the same fashion as said plastic plies but wherein insulating strips are present at both sides of both of said projections.

15. A method for manufacturing an electrical capacitor, comprising:

providing a wide band with regenerably thin metal layers as coatings on both sides;

applying an extremely thin plastic layer to a surface of at least one of said metal layers:

dividing said wide band into individual bands by cuts proceeding in a longitudinal band direction, said individual bands being of a width for drum winding;

providing two of said individual bands with intermittent metal-free insulating strips by laser beams, said insulating strips being in regions of edges of said individual bands and spaced at intervals in a winding direction so that said insulating strips lie in a plane perpendicular to a winding axis when wound on a drum, ends and beginnings of said insulating strips extending into an incision region;

guiding said individual bands during winding onto a drum so that centers of said insulating strips of an upper one of said individual bands are symmetrically arranged over centers of intermediate spaces between said insulating strips of a lower one of said individual bands;

layering said individual bands on said drum to form an initial capacitor;

providing at least end faces of said initial capacity formed by said edges of said individual bands with a metal layer by metal spraying while still on said drum and after winding;

producing incisions in said incision region perpendicular to the winding direction proceeding from both sides of said initial capacitor in a center between two respective cut lines, said incisions forming projections due to a width and depth of said incisions;

separating said initial capacitor into individual capacitors by insulating saw cuts along said cut lines which proceed through the centers of said insulating strips and by an insulating saw cut along a cut line lying parallel to said edges and in a center of said initial capacitor; and applying power leads to finish said electrical capacitor.

16. A method as claimed in claim 15, wherein said extremely thin plastic layer is applied by a lacquering process.

17. A method as claimed in claim 15, wherein said extremely thin plastic layer is applied by glow polymerization.

18. A method as claimed in claim 15, wherein said division of said at least one wide band into individual bands produces corrugated edges on said individual bands.

19. A method as claimed in claim 15, wherein said initial capacitor includes a plurality of mother capacitors separated from one another by non-active cover layers and parting layers.

20. A method as claimed in claim 19, wherein said plurality of mother capacitors are separated from one another at said parting layers before said incisions are produced, said incisions being produced in both sides of said mother capacitors.

21. A method as claimed in claim 15, wherein said extremely thin plastic layer is applied to said at least one metal layer in a strip proceeding in a longitudinal direction of said wide band to leave intermediate surfaces free, and wherein said dividing of said wide band into said individual bands occurs along centers of said intermediate surfaces so that said individual bands have edge regions free of said extremely thin plastic layer.

22. A method according to claim 15, wherein said metal layers applied to said wide band are applied in strips proceeding in a longitudinal direction of said wide band and leaving intermediate surfaces free, said strips lying opposite one another, and said dividing of said wide band into said individual bands occuring along centers of said intermediate surfaces and along centers between said intermediate surfaces.

23. A method as claimed in claim 15, wherein said power leads are applied perpendicular to a winding direction.

24. An electrical capacitor, comprising:
a consolidated stack of plastic plies layered against one another and provided with regenerably thin layers of valve metal as coatings on both surfaces of each and every plastic ply, said coatings alternately extending up to ends of said two projections from layer to layer, two projections formed by an incision of which proceeds in the direction of the thickness of the stack and roughly in the center of one side thereof;

metal layers provided on surfaces formed by the ends of said projections in the consolidated stack serving the purpose of electrical contacting, said metal layers being formed by metal spraying, said metal layers connecting the coatings to one another;

external power leads fastened to said two projections by said metal layers;

said valve metal coatings covering surfaces of said plastic plies practically up to edges at long sides of said consolidated stock as well as up to both ends of said two projections;

said two projections being alternately provided with metal-free insulating strips and residual metal strips from plastic ply to plastic ply;

said incision having a depth greater than a width of said residual metal strips; and an extremely thin plastic layer is present as a dielectric on both of said coatings on every second plastic ply, said extremely thin plastic layer completely covering said coating and extending up to a region of said residual metal strips and being at least partially removed above said insulating strips.

* * * * *